(12) United States Patent
Lu et al.

(10) Patent No.: US 8,386,795 B2
(45) Date of Patent: Feb. 26, 2013

(54) INFORMATION SECURITY DEVICE OF UNIVERSAL SERIAL BUS HUMAN INTERFACE DEVICE CLASS AND DATA TRANSMISSION METHOD FOR SAME

(75) Inventors: Zhou Lu, Beijing (CN); Huazhang Yu, Beijing (CN)

(73) Assignee: Feitian Technologies Co., Ltd., Beijing (CN)

( * ) Notice: Subject to any disclaimer, the term of this patent is extended or adjusted under 35 U.S.C. 154(b) by 1148 days.

(21) Appl. No.: 11/534,991

(22) Filed: Sep. 25, 2006

(65) Prior Publication Data

US 2007/0208949 A1    Sep. 6, 2007

(30) Foreign Application Priority Data

Jan. 27, 2006  (CN) .......................... 2006 1 0002400

(51) Int. Cl.
*G06F 21/00*    (2006.01)
(52) U.S. Cl. ...................................................... 713/182
(58) Field of Classification Search .................. 713/182, 713/165, 172, 192, 194; 726/9
See application file for complete search history.

(56) References Cited

U.S. PATENT DOCUMENTS

| | | | |
|---|---|---|---|
| 6,615,264 B1 * | 9/2003 | Stoltz et al. ................... 709/227 |
| 6,748,541 B1 * | 6/2004 | Margalit et al. .................. 726/9 |
| 6,965,368 B1 * | 11/2005 | Andrews et al. .............. 345/156 |
| 7,290,072 B2 * | 10/2007 | Quraishi et al. ............... 710/105 |
| 7,711,860 B2 * | 5/2010 | Park .................................. 710/8 |
| 7,711,915 B2 * | 5/2010 | Poo et al. ....................... 711/163 |
| 7,831,837 B1 * | 11/2010 | Duane et al. .................... 713/185 |
| 2005/0182934 A1 * | 8/2005 | Elteto ............................ 713/169 |
| 2006/0031752 A1 * | 2/2006 | Surloff et al. .............. 715/501.1 |
| 2006/0053244 A1 * | 3/2006 | Fruhauf et al. ................ 710/313 |

* cited by examiner

*Primary Examiner* — Ali Abyaneh
(74) *Attorney, Agent, or Firm* — Hammer & Associates, P.C.

(57) ABSTRACT

The present invention relates to an information security device of Universal Serial Bus (USB) Human Interface Device (HID) class and the data transmission method for the same. With a master chip that has a built-in HID descriptor and a USB interface chip connected to the master chip, the device of the present invention itself may be designed to be compact and easy to use, and provide powerful functions. With the USB HID interface, the device user does not need to install a driver and the user can use the device anywhere and anytime. And the user does not need to manage the driver whose version updates constantly, consider the compatibility of various product drivers, face the risk caused by the driver when running OS, and worry about the pollution to the system resulted from the installation and uninstallation of the driver. CPU, SCM or smart card chip used as the master chip ensures that the security of identity authentication is reliable. Moreover, the security of identity authentication device can be further improved by adding biometric identification module and/or the like.

5 Claims, 2 Drawing Sheets

INFORMATION SECURITY DEVICE OF UNIVERSAL SERIAL BUS HUMAN INTERFACE DEVICE CLASS AND DATA TRANSMISSION METHOD FOR SAME

FIELD OF THE INVENTION

The present invention relates to an information security device of Universal Serial Bus (USB) Human Interface Device (HID) class and the data transmission method for the same.

BACKGROUND OF THE INVENTION

With the popularity of the Internet and the rise of e-business and e-government, more and more people begin to try online transactions. Meanwhile, more and more personal privacy and business secrets information is transmitted over the network. However, the malicious threats, such as virus, hacker, and phishing fraud, bring a great challenge to the security of online transactions. Endless network crimes lead to a trust crisis to the identity on network. We have to focus on the problems on how to prove "who am I?" and how to prevent identify thefts again. It is urgent to safeguard identify authentication/recognition which is the primary problem in network security. The major identify authentication/recognition methods used in computer and network systems are username/password, ID card, dynamic password and USB Key (Token).

Username/password is the commonest and simplest method for identity authentication, but the password is easy to be doped out by other people. In addition, the password is static data and is transmitted through computer memory and network during authentication, so it is easy to be captured by Trojan or listener on network. Therefore, it's not a good method for identity authentication.

ID card authentication prevents user identity from being counterfeited as ID card cannot be duplicated. But the data read from ID card is also static and it is easy to be captured by memory scan or network listening. The security problems persist.

Dynamic password is a technology that allows user password to change with time or the number of uses, and the password can be used only once. Since each password must be generated by dynamic token and the private hardware of dynamic token is held only by valid user, the user identity can be authenticated through password verification. But if the time or the number of uses between the client and the server is not synchronized properly, a valid user probably could not log in. And the user is required to enter a long string of ruleless password using keyboard each time the user logs in, once there is a typo, the user must enter the password again. Obviously, it is not easy to use.

SUMMARY OF THE INVENTION

The present invention overcomes above defects and provides a simple and secure information security device of the Universal Serial Bus (USB) Human Interface Device (HID) class, which is integrated with the features and advantages of both USB Key (Token) and HID devices, and the data transmission method for the device.

The solution of the present invention to the technical problems is: an information security device of Universal Serial Bus (USB) Human Interface Device (HID) class, comprising a master chip with a built-in HID descriptor, and a USB interface module connected to the master chip.

The information security device may comprise an additional authentication module, which is an intelligent authentication module including a biometric identification module or a card reader module.

The USB interface module may be built in the master chip, or be a USB HID interface chip separated from the master chip.

The master chip may be a microprocessor or smart card chip, comprising a Central Processing Unit (CPU), a Microcontroller Unit (MCU), or a Single Chip Micyoco (SCM).

A data transmission method for the information security device, comprising the steps of:
1) the host recognizing the information security device;
2) the host sending control commands to the device;
3) the device resolving and processing the control commands after receiving them;
4) the device responding to the application and returning the execution results.

The control commands are transmitted through HID instructions between the host and the information security device.

The control commands may include PIN authentication, signature authentication, data downloading, file access, privilege management and/or read/write operation.

The control commands may be transmitted in the form of cipher text after being encrypted.

The HID instructions may include Set_Report and Get_Report commands.

The algorithm used to encrypt the control commands is RSA, DES, 3DES, HMAC-MD5 or TEA, or the combination of some of them.

The advantages of the present invention compared with existing technologies are: the information security device itself may be designed to be compact and easy to use, and provide powerful functions. With the USB HID interface, the device user does not need to install a driver and the user can use the device anywhere and anytime. And the user does not need to manage the driver whose version updates constantly, consider the compatibility of various product drivers, face the risk caused by the driver when running OS, and worry about the pollution to the system resulted from the installation and uninstallation of the driver. CPU, SCM or smart card chip used as the master chip ensures that the security of identity authentication is reliable. Moreover, the security of identity authentication device can be further improved by adding biometric identification module and/or the like.

BRIEF DESCRIPTION OF THE DRAWINGS

The present invention may be further understood from the following description in conjunction with the appended drawings. In the drawings.

DETAILED DESCRIPTION OF THE EMBODIMENTS

As a more and more widely used PC interconnection protocol, USB makes the connection between peripherals and computer more effective and convenient. This kind of interface applies to many devices. It is quick, supports for plug and play and hot swap, and can be connected to up to 127 devices at one time. It can solve such problems as resource conflict, interrupt request and direct data channel. Accordingly, more and more developers try to apply this kind of standard interface to their products.

It is so convenient that the user does not need to install a driver for a HID device for Windows 98 SE or higher. The user can use the device anywhere and anytime, without installing a driver when using a PC peripheral. And the user does not need to manage the driver whose version updates constantly, consider the compatibility of various product drivers, face the risk caused by the driver when running OS, and worry about the pollution to the system resulted from the installation and uninstallation of the driver. All these will benefit the primary users who are not very sophisticated to PCs.

The identity authentication based on USB Key is a convenient and secure identity authentication technology emerged in recent years. It employs a strong two-factor authentication mode that combines software with hardware and uses one-time pad technology, obtaining high security without the cost of usability.

The present invention integrates the features and advantages of USB Key with those of HID devices, and applies driver-free USB Key to identity identification in network security area. The present invention will be further understood from the following description.

Figure 3:
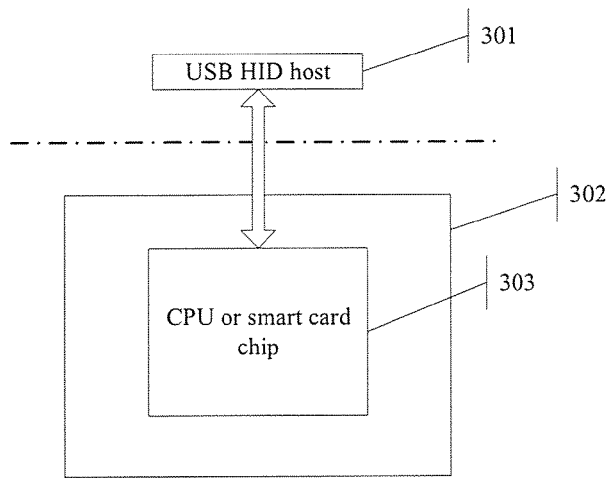
FIG. 3 is a hardware structure diagram of the first embodiment of the present invention.

The driver-free USB Key thereof is a hardware device that has a USB HID interface. Referring to FIG. 3, the information security device 302 has a high performance built-in SCM or smart card chip 303. It is connected to the host 301 via a built-in USB interface. The SCM or smart card chip 303 can store user keys or digital certificates. The user identity is authenticated with the encryption algorithms built in USB Key. The SCM or smart card chip has built-in operating system. The hardware supports RSA, DES, 3DES and TEA algorithms.

RSA keys and random numbers are generated by the hardware. The firmware supports downloads of $3^{rd}$ party algorithms. According to the above mentioned structure, data transmission is processed as follows:

1. The host recognizes the device.

The host establishes connection to the information security device 302 by enumerating a USB HID device, and then gets HID class and report descriptor and sets up communication with the information security device finally. The host reads the file system of the information security device and gets related information.

2. The host sends a command to the device.

When receiving an authentication request from the user, the host sends authentication data to the device using an HID-specific request, Set-Report control transmission command. This request can be PIN authentication, signature authentication, data downloading, file access, privilege management or read/write.

3. The device resolves and processes the command.

After receiving Set_Report command from the host, the information security device resolves the command according to the data resolving protocol defined previously and performs appropriate security operations, such as conducting PIN authentication and signature authentication, downloading necessary data to the specified location, reading/writing/modifying/adding/deleting files according to file access privilege, or changing operation privileges on files.

4. The device responds to the application.

When finishing the specified operation, or making a new request to the application, the device sends related data such as execution results to the application in response to the request of the application.

The identity authentication system based on USB Key has two major application schemas: the authentication schema based on challenge/response and the authentication schema based on Public Key Infrastructure (PKI).

For the identity authentication technology of the authentication schema based on challenge/response, the application process will be described below.

The First Embodiment

Figure 1:
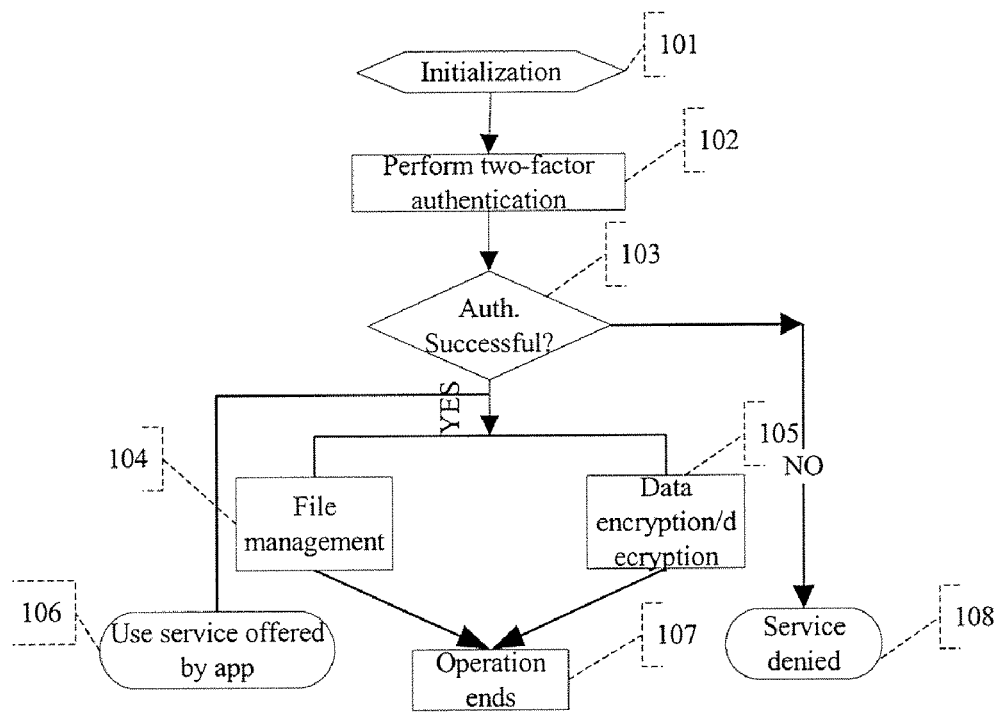
FIG. 1 is a control flow diagram of the first embodiment of the present invention.
Figure 2:
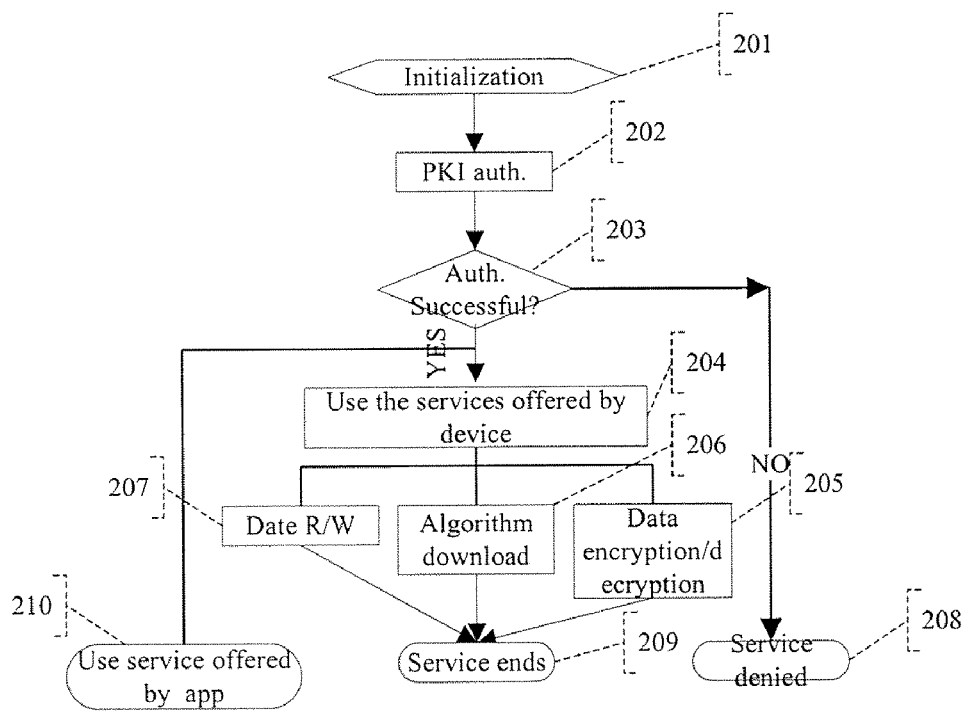
FIG. 2 is a control flow diagram of the second embodiment of the present invention.

Referring to FIG. 1, the application performs the initialization process, as shown in Step 101. When it is required to authenticate user identity on network, perform two-factor authentication, as shown in Step 102. Once the weak factor (PIN) authentication is passed, the device will receive random numbers and encrypt them with defined algorithm(s), then return the results to the terminal which will therefore confirm the results.

After the two-factor authentication finishes, the application judges whether the authentication is successful, as shown in Step 103. The application side can provide the service, as shown in Step 106, or deny the service, as shown in Step 108. Additionally, it can also perform file management, as shown in Step 104, or other data operation, as shown in Step 105, on the information security device. Finally, the operation is completed, as shown in Step 107.

During the application process of the present embodiment, key calculation is run on the hardware of the information security device and the server respectively. It does not appear in client memory, or on network. Because the algorithm HMAC-MD5 is not reversible, which means that you can get the calculation result if you know the key and the random number used in the calculation, but you cannot get the key if you know the random number and the calculation result. So the key is secured, and the user identity is secured thereby.

The Second Embodiment

Figure 4:
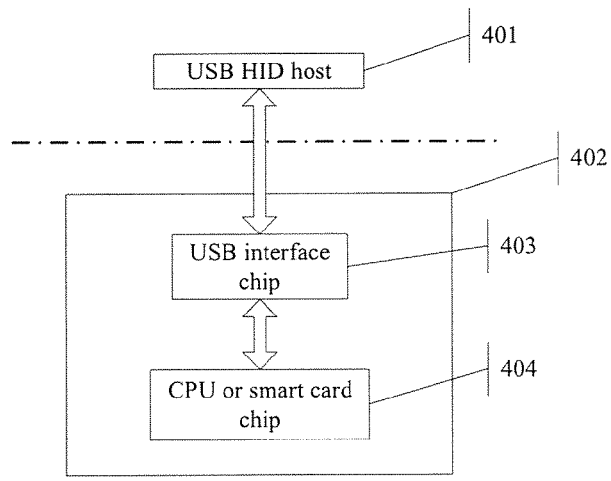
FIG. 4 is a hardware structure diagram of the second embodiment of the present invention.

Referring to FIG. 4, the information security device 402 contains a high performance CPU chip 404 and is connected to the host via a USB interface chip 403 which is used to resolve the USB communication protocol. The algorithm HMAC-MD5 is implemented and the random numbers are generated by the high performance CPU chip in combination with the USB interface chip. The firmware supports 3-level file access and privilege management.

According to the above structure and the authentication schema based on PKI system, the application process of the present invention is described in details below.

PKI authentication is a unified technical framework used to provide data encryption and digital signature services in the public network environment using the public key encryption technology of modem cryptography.

As the authentication technology based on Certificate Authority (CA) is getting completed, identity authentication and data encryption are embodied using a digital certificate in the present embodiment. The digital certificate is issued by an authoritative and just $3^{rd}$ party authority (i.e. a CA Center). The encryption technology based on the digital certificate enables the encryption and decryption, digital signature and signature verification of the information transmitted on the network, assures the confidentiality and integrity of the information, the authenticity of the identities of transaction entities and the incontestability of signature information, and therefore maintains the security of network applications.

First, perform the initialization operation, as shown in Step 201. When the server needs to authenticate the user's identity, it performs PKI authentication, as shown in Step 202. The device encrypts the received data with a private key, and returns the result to the terminal. After receiving the encryption result, the server decrypts it to verify if the authentication data is correct.

After PKI authentication finishes, whether the authentication is successful will be judged, as shown in Step 203. If it fails, the service will be denied, as shown in Step 208. Otherwise, use the service offered by the application, as shown in Step 210. Moreover, the services, such as data reading/writing, as shown in Step 207, algorithm downloading, as shown in Step 206, and data encryption/decryption, as shown in Step 205, can be offered and used by the present embodiment, as shown in Step 204. Then go to the end, as shown in Step 209.

In the present embodiment, each user has a private key held only by himself to decrypt and sign, meanwhile, the user also has a public key which is open to the public to encrypt and verify the signature. When sending a confidential document, the sender encrypts the data using the public key of the receiver, and the receiver decrypts the data with his private key. Thereby, the information can be forwarded to the destination correctly and safely. Even if the information is captured by a $3^{rd}$ party, it can not be decrypted without the private key. It is guaranteed that the encryption process is an irreversible process by digital means, i.e. to decrypt the data, the private key is a must.

The user can also process the information using the private key of his own. Since the private key is held only by the foregoing user, a document that cannot be generated by others will be produced, and then a digital signature comes up. Using the digital signature can ensure that:

1) the information is signed and sent by the signer himself, and the signer cannot deny or is difficult to deny it's signature; and 2) the information has not been modified from it is signed until it is received, and the signed document is the authentic document.

The Third Embodiment

Figure 5:
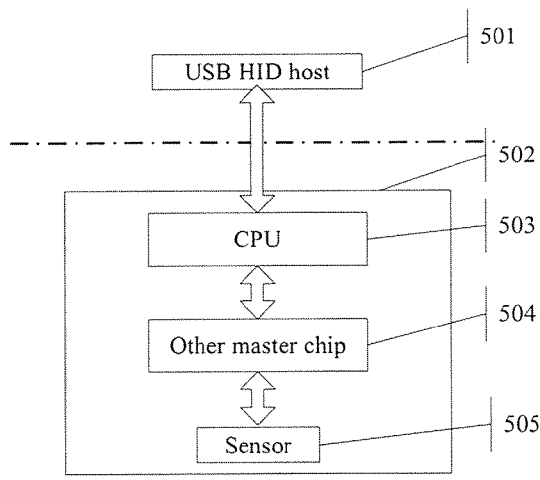
FIG. 5 is a hardware structure diagram of the third embodiment of the present invention.

Referring to FIG. 5, the information security device 502 comprises a biometric identification module in addition to the high performance CPU 503 referred in the $2^{nd}$ embodiment. The biometric identification module comprises a sensor 505 for extracting biometric information and a control chip 504 for converting the information into control signals that can be recognized by CPU. The control chip 504 is connected between the CPU 503 and the sensor 505. Therefore, a biometric identification feature is added to the device, the security of the authentication is further increased. Alternatively, a reader module for example can be employed for the same purpose.

The information security device of USB HID class and the data transmission method for the information security device provided by the present invention are described in details above. It will be appreciated by those of ordinary skill in the art that the invention can be embodied in other specific forms without departing from the spirit or essential character thereof. The presently disclosed embodiments are therefore considered in all respects to be illustrative and not restrictive. The scope of the invention is indicated by the appended claims rather than the foregoing description, and all changes which come within the meaning and range of equivalents thereof are intended to be embraced therein.

The invention claimed is:

1. A data transmission method for an information security device used to access a host comprising the steps of:

1) the host recognizing the information security device by
    establishing a connection to the information security device by enumerating an USB HID device by the host, obtaining a HID class and a report descriptor,
    setting up communication with the information security device,
    reading a file system of the information security device, and
    obtaining related information by the host;

2) the host sending control commands to the device, via HID instructions, by
    receiving an authentication request from a user by the host, and
    sending an authentication data to the device using a Set_Report control transmission command of a HID-specific request by the host;

3) the device resolving and processing the control commands after receiving the control commands by
    resolving a Set_Report control transmission command of the HID specific request from the host,
    performing security operations comprising PIN authentication, signature authentication, data downloading, file access, privilege management, or read/write operations by
    performing the initialization process,
    performing a weak factor authentication, wherein the weak factor is a PIN authentication,
    receiving random numbers from the host and encrypting the random numbers with a defined key calculation algorithm by the device when the weak factor authentication is passed, the key calculation algorithm using a key supplied by the user, thereby producing execution results,
    returning the encrypted random numbers to the host, and
    confirming the encrypted random numbers by the host with the key calculation algorithm executed on the host;
    wherein key used to execute the key calculation algorithm on the device does not appear in the host; and 4) sending the execution results of the security operations to the host.

2. The data transmission method for the information security device according to claim 1, wherein the control commands are transmitted in the form of cipher text after being encrypted.

3. The data transmission method for the information security device according to claim 2, wherein the key calculation algorithm used to encrypt the control commands is RSA, DES, 3DES, HMAC-MD5 or TEA, or the combination of some of them.

4. The data transmission method for the information security device according to claim 1, wherein the HID instructions include Set_Report and Get_Report commands.

5. The data transmission method for the information security device according to claim 1 comprising:
    performing initialization operation,
    encrypting received data with a private key by the device,
    returning encryption result to the host,
    receiving the encryption result by the host,
    decrypting the encryption result with a public key by the host, and
    verifying if the authentication data is correct by the host.

* * * * *